April 29, 1952     L. K. FEHRENBACH     2,594,894
APPARATUS FOR PELLETIZING
Filed May 26, 1950     2 SHEETS—SHEET 1

INVENTOR.
LUDWIG K. FEHRENBACH
BY Parham & Bates
ATTORNEYS

April 29, 1952  L. K. FEHRENBACH  2,594,894
APPARATUS FOR PELLETIZING
Filed May 26, 1950  2 SHEETS—SHEET 2

INVENTOR
LUDWIG K. FEHRENBACH
BY Parham & Bates
ATTORNEYS

Patented Apr. 29, 1952

2,594,894

UNITED STATES PATENT OFFICE 2,594,894

APPARATUS FOR PELLETIZING

Ludwig Karl Fehrenbach, Hartford, Conn., assignor to Plax Corporation, West Hartford, Conn., a corporation of Delaware Application May 26, 1950, Serial No. 164,519

7 Claims. (Cl. 18—12)

The present invention generally relates to the manufacture of molding powder or pellets of thermoplastic resin polymers, such as polyethylene and the like, and more particularly to the manufacture of suitable powder or pellets from scrap material.

In fabricating products such as sheet, tubing and the like, of thermoplastic resins, quantities of scrap also may be produced. A number of difficulties are encountered in attempting to re-use this scrap, particularly in the case of thin film which when fed into an extruder for melting down and direct reextrusion in sheet form may effect an irregular extrusion pressure and produce a non-uniform product. Preferably, the scrap should be melted down and repelletized as it has been found that extrusion practices are more successful when molding powders or pellets of a desired grain size are fed to the extruder. Generally, a more homogeneous product is extruded and temperature and pressure conditions within the extruder are more readily maintained.

It is an object of the present invention to provide improved apparatus for pelletizing thermoplastic materials and particularly scrap.

A further object is to provide apparatus of the type indicated, which is simple in its construction and operation, and which can be attached to any available extruder to pelletize scrap.

Further objects and advantages of the invention are pointed out or will be apparent from the following description of a preferred embodiment of the invention which makes reference to the accompanying drawings in which.

Figure 1:
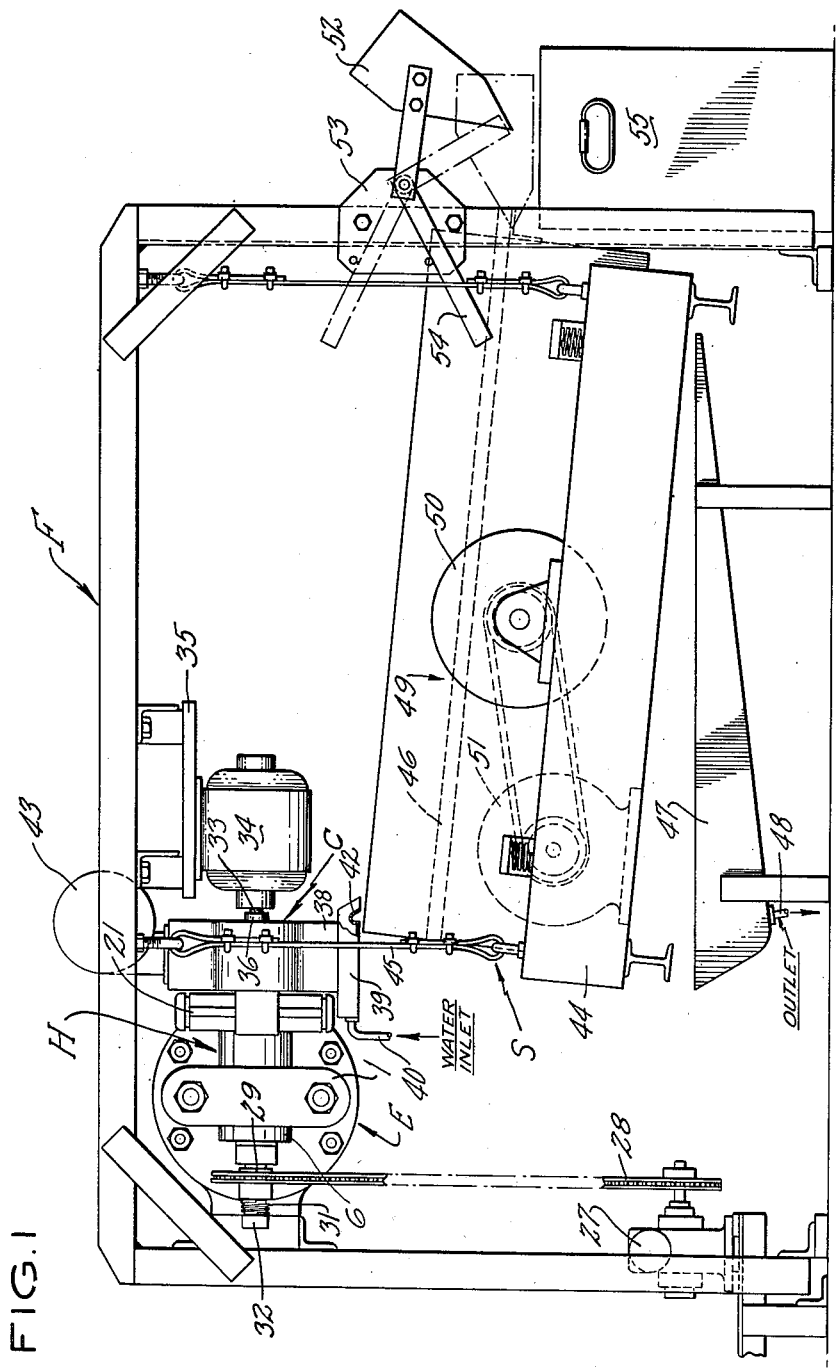
Figure 1 is a side elevational view of the preferred embodiment of the pelletizing apparatus embodying the invention.

Referring to the drawings, the illustrated pelletizing apparatus there shown includes a frame, generally designated F, to which there is secured an extruder, generally designated E, which is adapted to extrude through a pellet die head H, a number of thermoplastic resin fibers for cutting, by cut-off mechanism C, into pellets of a desired grain size.

As shown in Fig. 1, the extrusion head H is secured by means of a strap 1 to the extruder E so that plastic from the extruder is supplied through a nipple 2 (Fig. 3) to the extrusion head H.

Figure 3:
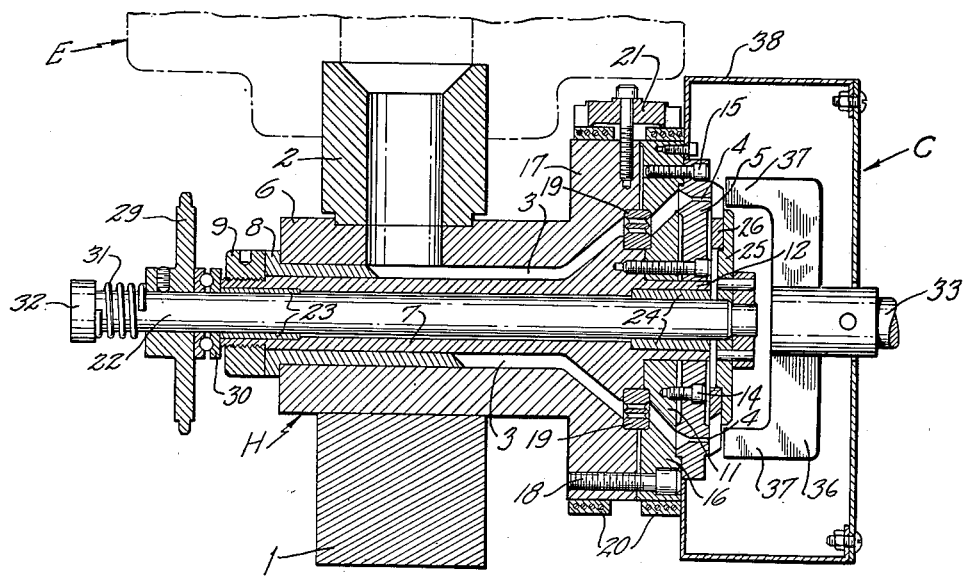
Fig. 3 is a cross-sectional view taken on line 3—3 of Fig. 2 showing details of the extrusion and cut-off mechanism.

As shown in Fig. 3, the head H is a composite structure having an annular passageway 3 through which plastic material is supplied to spaced orifices 4 in a die plate 5 from which the plastic is extruded as individual filaments.

More particularly, the head H includes a generally cylindrical hollow block 6 in which a core member 7 is axially disposed. A spacer 8 secured by nut 9 on the rear portion of the core 7 closes the rear end of the passageway 3. The die plate 5 and an inner ring 11 are secured on an axially disposed sleeve portion 12 at the front of the core 7 by means of screws 13 and 14. The die plate 5 also is secured by one or more bolts 15 to an outer ring 16 which is concentrically disposed relative to the inner ring 11 by, and is secured to, a forward flanged portion 17 of the block 6 by means of bolts 18.

It will be apparent that the several components of the head H may be readily disassembled to clean the annular supply passage 3 and can be reassembled without delaying adjustments.

As shown in Fig. 3, a breaker plate 19 preferably is secured by the assembled block 6, core 7, outer ring 16, and inner ring 11 in the passageway 3 so as to assure that the plastic is supplied to the die in proper condition for extrusion. Heating rings 20 may be secured about the head as by means of clamps 21 for controlling the temperature of the extruded plastic.

A shaft 22 which extends through the center of the hollow core 7, and is rotatably journaled in bearings 23 and 24 in the ends of the core, has a knife blade holder 25 secured to its forward end on which knives 26 are mounted for cutting plastic filaments extruded from the die 5 into short lengths. As shown in the drawings, the shaft 22 is concentrically disposed relative to the ring of die outlets or orifices 4 so that the fiber lengths cut by the knives 26 are all of a substantially uniform length.

Rotation of the shaft 22 and the knives 26 carried thereon is effected by a motor 27 and chain drive 28 through a sprocket 29 secured on the shaft adjacent its rear end. A thrust bearing 30 is disposed about the shaft 22 between the core 7 and the sprocket 29 and the knives 26 are thereby restrained in proper cutting relation to the die 5 by a spring 31 located at the rear end of the shaft between the sprocket 29 and a spring retainer 32.

In accordance with the present invention, a second shaft 33 is coaxially disposed relative to the shaft 22 and is rotated in the opposite direction as by means of a second motor 34 which is secured by a bracket 35 to the frame F. The shaft 33 carries a generally U-shaped member 36, ends 37, 37 of which are disposed so as to knock off any plastic lengths or pellets which may adhere to the blades 26. A pellet guard and confining housing 38 preferably is located about the knife blades 26 and the blade cleaner 36.

In accordance with the invention, a pan or tank 39 is provided at the bottom of the guard 38 into which water or other liquid coolant is supplied by a line 40 through a pierced pipe 41 (Fig. 2) located at the rear of the tank. Preferably a dam 42 is provided along the forward edge of the tank 30 so as to maintain a depth of water in the tank and over which the water or other coolant escapes bearing the plastic pellets extruded through the die openings 4 and cut to length by the knives 26.

Figure 2:
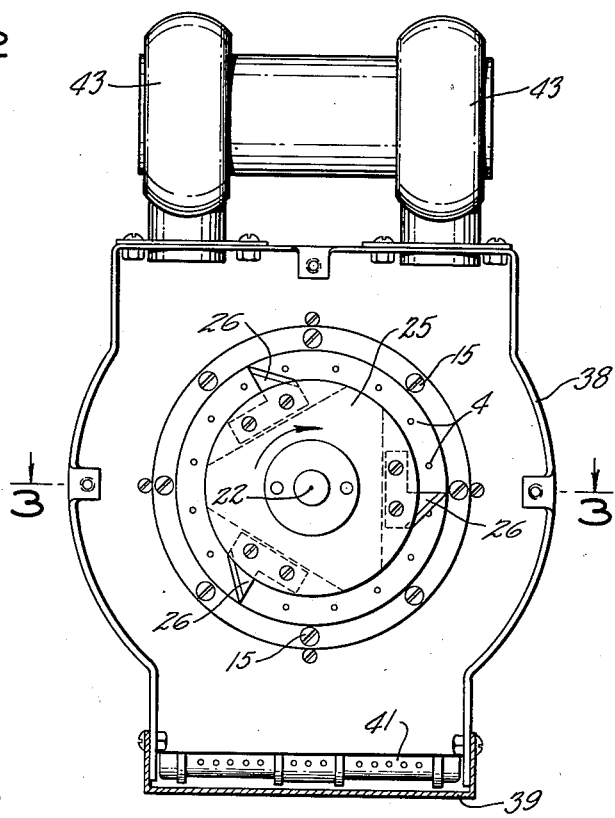
Fig. 2 is an enlarged front elevational view of pellet extruding and cut-off mechanism shown in Fig. 1.

As shown in Fig. 2, there is mounted on the guard 38 a buckwheat blower 43 which blows air downward into the guard and helps to direct the plastic pellets into the water bath in the tank 39 and out over the dam 42.

Disposed beneath the tank 39 is an automatic screening and drying assembly, generally designated S, which includes a frame 44 suspended by means of guy wires 45 from the frame F and having a screen 46 for supporting the plastic pellets while permitting overflow water from the tank 39 to escape through the screen into a catch basin 47 from which the water or other coolant may be removed through an outlet 48 and returned by a supply pump (not shown) to the inlet line 40.

A suitable vibrator mechanism, generally designated 49, including an out-of-balance fly wheel 50 and a drive motor 51, is mounted on the screen frame 44 and operates to vibrate the screen 46 and keep the plastic pellets in motion thus preventing them from sticking.

As shown in Fig. 1, a box 52 may be operably mounted on a hanger 53 secured to the frame F for collecting the cooled and dried pellets and may be provided with manually operable lever 54 for dumping the box 52 to discharge its contents into a storage container 55.

The general operation of the invention will be apparent from the above description of the embodiment illustrated in the drawings.

In manufacturing molding powder pellets with the described apparatus, it has been found preferable to extrude the plastic in the upper portion of the temperature range found by experiment to be practicable. The lengths cut off by the knife blades 26 then have sufficient internal heat and stress to automatically change from their generally cylindrical shape to a generally spherical shape which is desirable for molding powder pellets.

It is an important feature of the present invention that the knife blades 26 pass each of the die orifices 4 at like intervals so that molding powder granules or pellets of a substantially uniform size are produced. In the illustrated embodiment of the invention, this is effected by spacing each of the die orifices 4 a like distance from the adjacent orifices and equi-distant from the axis of rotation of the knives 26.

Another important feature of the invention is the provision of the rotating knock-off member or knife cleaner 37 which serves to prevent sticking of one or more pellets to each other or to the knife blades 26.

Having thus described a preferred embodiment of the invention, I claim:

1. Apparatus for pelletizing thermoplastic resin material comprising an extrusion die having a plurality of spaced fiber extruding orifices, an extruder for plasticizing and extruding the material through the die orifices as fibers, rotatable cut-off blade cooperating with the die to cut the fibers into pellet lengths, and a movable knock-off member for engaging and removing pellet lengths from the blade.

2. Apparatus as recited in claim 1 and wherein said cut-off blade and said knock-off member are rotatable in opposing directions, and means for rotating said blade.

3. Apparatus for pelletizing thermoplastic resin material plasticized and extruded from an extruder and comprising an extrusion die assembly mountable upon an extruder and including a die plate having a plurality of spaced fiber extruding orifices disposed generally in a circle, a cut-off blade cooperating with the die to cut the fibers into pellet lengths, said blade being rotatable about an axis which is generally concentric with the circle of die orifices and a knock-off member rotatable about the axis of rotation for the blade and adapted to knock pellet lengths from the blade.

4. Apparatus as recited in claim 3 and including means for rotating said blade and said knock-off member about their common axis.

5. Apparatus for pelletizing thermoplastic resin material extruded in a plasticized condition and comprising an extrusion die having a plurality of spaced fiber extruding orifices generally disposed in a circle, a rotatable cut-off blade cooperating with the die to cut the fibers in a plasticized condition into pellet lengths, and a knock-off member adapted to knock plasticized pellet lengths from the blade, means for rotating said blade and said knock-off member relative to each other and said die.

6. Apparatus for pelletizing thermoplastic resin material comprising an extrusion die having a plurality of equally spaced fiber extruding orifices disposed in a circle, an extruder for plasticizing and extruding the material through the die orifices as fibers, a cut-off blade cooperating with the die to cut the fibers into pellet lengths, said blade being rotatable about an axis concentric with the circle of die orifices, a knock-off member rotatable about the axis of rotation for the blade and adapted to knock pellet lengths from the blade, means for rotating said blade and said knock-off member in opposite directions about their common axis, a water bath to catch and cool the plastic pellets to a set condition, a blower for directing the pellets into the bath and out onto a vibrating drier.

7. Apparatus for pelletizing thermoplastic resin material extruded in a plasticized condition and comprising an extrusion die having a plurality of spaced fiber extruding orifices generally disposed in a circle, a rotatable cut-off blade cooperating with the die to cut the plasticized fibers into pellet lengths, said blade being rotatable about an axis generally concentric with the circle of die orifices, a knock-off member rotatable about the axis of rotation for the blade and cooperating to knock plasticized pellet lengths from the blade, means for rotating said blade and said knock-off member in opposite directions about their common axis, and means for setting the plasticized pellets in a non-plasticized condition.

LUDWIG KARL FEHRENBACH.

REFERENCES CITED

The following references are of record in the file of this patent:

UNITED STATES PATENTS

| Number | Name | Date |
|---|---|---|
| 1,290,505 | Bulley | Jan. 7, 1919 |
| 1,825,475 | Pfeiffer | Sept. 29, 1931 |
| 2,006,586 | Downard | July 2, 1935 |
| 2,401,236 | Fielitz | May 28, 1946 |
| 2,436,201 | Cole | Feb. 17, 1948 |